United States Patent Office 3,397,956
Patented Aug. 20, 1968

3,397,956
PROCESS FOR MANUFACTURING PHOSPHORIC ACID
William T. Buchanan, Tulsa, Okla., and Charles R. Hedenstad, Severna Park, Md., assignors to Nalco Chemical Company, Chicago, Ill., a corporation of Delaware
No Drawing. Filed July 28, 1966, Ser. No. 568,408
5 Claims. (Cl. 23—165)

ABSTRACT OF THE DISCLOSURE

A composition containing (a) the reaction product of a fatty acid with either alkylene polyamines or aminoalkyl alkanol amines and (b) an organic distillate is employed in the digestion of phosphate rock with $H_2SO_4$, prior to filtering of the $CaSO_4$ to alter the crystal formation of and prevent deposits of $CaSO_4$ from fouling the equipment.

---

This invention relates to an improved process for manufacturing phosphoric acid from phosphate rock, wherein phosphate rock is digested with sulfuric acid to form calcium sulfate and phosphoric acid. More particularly, the invention relates to the prevention of the formation of fouling deposits during filtration and concentration of the phosphoric acid produced by the above reaction.

The production of phosphoric acid has become a major industry, with over 3.5 million tons of $P_2O_5$ being produced in 1964. Basically, the process comprises 3 sequential steps. First, phosphate rock is reacted with or digested by concentrated sulfuric acid in large rubber-lined tanks. Every attempt is made in these large vessels, some of which are capable of holding as much as one million gallons, to insure complete reaction between the sulfuric acid and the phosphate rock. Amounts of phosphoric acid are oftentimes recycled to the digestion reactor to lower the viscosity, thereby assisting the agitation devices in achieving sufficient intermixing. During the digestion step, two principal products are formed along with a minor amount of impurities. The reaction of phosphate rock and sulfuric acid produces insoluble calcium sulfate, in various hydrated forms, and phosphoric acid, expressed as $P_2O_5$. Once the reaction is complete, the mixture of calcium sulfate and phosphoric acid is passed through a filtration device to remove the calcium sulfate from the phosphoric acid. Oftentimes, plants employ a number of filters connected in series. After purification, the phosphoric acid is then normally passed through a concentration device, such as a heat exchanger or evaporator, to increase the concentration up to about 54% by weight $P_2O_5$. By careful regulation of the process through adjustment of reaction temperature, concentration and flow rates, the industry has found it possible to achieve 99% or greater efficiency based on theoretical amounts of $P_2O_5$.

Even though a high degree of efficiency is possible in the phosphoric acid process, several drawbacks have been found as greater and greater production efficiency is sought. One such problem is the formation of deposits on the filter devices and/or the concentration devices which reduce flow rates and eventually plug these devices, thereby causing loss of production time for cleaning and repair. Substantially all of the deposits formed on these devices results from the minute calcium sulfate particles which are formed during the digestion step. The industry has attempted to adjust the amount of water found in the calcium sulfate hydrate by reaction temperatures to vary the size of the crystal formed. Even under optimum conditions, however, some minor amount of the minute particles are formed. These particles plug the filters in some cases, and, if the particles are small enough to pass through the filter medium, will plug or form deposits on the concentration devices. It is believed that the higher temperatures involved in concentrating the phosphoric acid result in further insolubilization of dissolved or suspended calcium sulfate crystals. These deposits materially reduce the heat transfer coefficients of concentration devices and eventually build up to a point where plugging occurs.

Accordingly, it is an object of this invention to provide an additive which would substantially improve the process of manufacturing phosphoric acid.

More particularly, it is an object of this invention to provide an additive which materially reduces the formation of deposits during filtration and concentration of phosphoric acid.

A specific object of this invention is to provide an improved process for producing phosphoric acid wherein substantially less down-time is required in the operation of the filtration devices and concentration devices used therein.

Other objects will appear hereinafter.

In accordance with the invention, it has now been discovered that the process for manufacturing phosphoric acid from phosphate rock can materially be improved by the addition of an antifouling amount of an additive comprising (1) from 1 to 40% by weight of the product formed from reaction of a fatty acid and an amine containing compound selected from alkylene polyamines and aminoalkyl alkanol amines, and (2) 60 to 99% by weight of an organic distillate having a closed cup flash point greater than 100° F. The antifoulant may be added to the phosphate rock at any time prior to filtration. It is preferred to have the point of addition prior to or during the addition of the sulfuric acid. Under some circumstances, it may be desirable to include an emulsifier in order to permit proper distribution of the antifoulant of this invention in the phosphoric acid system. Accordingly, it is contemplated that the above-described antifoulant may be employed in conjunction with an emulsifier without departing from the spirit of the invention described and claimed herein. It has not been found that any particular emulsifier is preferred, due to the varied nature of the product of this invention. An excellent source of emulsifiers is found in Detergents and Emulsifiers Annual (1965) by John T. McCutcheon.

The first portion of the antifoulant of this invention is, as stated above, the reaction product of a fatty acid and the above-named amine-containing compounds. Specific examples of the amine-containing compounds are the polyamines such as diethylenetriamine, triethylenetetramine, tetraethylenepentamine, tripropylenetetramine, and the like. Also, the various alkanol amines such as aminoethyl ethanolamine and its various homologues fall within the above class of starting reactants.

The term "fatty acid" includes any aliphatic carboxylic acid having at least 7 carbon atoms and preferably at least 12 carbon atoms. Examples of starting acids that may be used in the preparation of the compounds of this invention are hexanoic, octanoic, decanoic, dodecanoic, tetradecanoic, hexadecanoic, octadecanoic, eicosanoic, docosanoic and tetracosanoic acids. Several illustrative unsaturated fatty acids useful as starting ingredients are dodecenoic, tetradecenoic, hexadecenoic, octadecenoic, eicodecenoic, octadecandienoic and 12-hydroxyoctadecenoic acids. The various fatty acids derived from natural fats and oils may also be used. Thus, acids made from coconut, corn, cottonseed, linseed, palm, soy bean, tall and tung oils as well as such fats as lard and tallow may be employed.

The reaction product may be formed by simply heating the fatty acid and the amine-containing compound in a reaction vessel. This reaction is conventional, and for that reason, choice of the reaction conditions will be left to the manufacturer.

The second component which makes up the antifoulant of this invention has been termed an organic distillate having a closed cup flash point greater than 100° F. This component is intended to include both petroleum and coal tar distillates. Closed cup flash point may readily be calculated by the following formula. The closed cup flash point, in ° F., equals 0.73 times the initial boiling point in ° F. minus 122. This formula is applicable for petroleum and coal tar distillates between initial boiling point of −150° F. and +550° F. Examples of various organic distillates are various fuel oils such as fuel oil No. 1, 2, etc., all of which have closed cup flash points greater than 100° F. Particularly preferred are fuel oil No. 5 and fuel oil No. 6 which have closed cup flash points greater than 150° F. Also, preferred for the purposes of this invention is mineral seal oil which has a closed cup flash point of 170° F.

In accordance with the discovery of this invention, it has been found that the reaction product described above alone is not capable of providing sufficient antifouling protection. It has been found that the combination of the two ingredients is necessary to achieve satisfactory prevention of deposits on filtration devices and on concentration devices used in the phosphoric acid production process.

Presented below in Table I are a number of examples of antifoulants useful in the process of this invention. As is readily discernible, a wide variety of combinations may be employed which fall within the scope of the invention.

A basic for the theoretical analysis of the process of this invention may be attributed to the fact that neither of the two componens alone are capable of affording antifoulant protection. If the reaction product of the fatty acid and the amine-containing compound are added alone, or together with some solvent having a low flash point, some effect on the prevention of filter plugging is noted. However, substantially no reduction in deposit formation in concentration devices has been found. Likewise, the use of organic distillate alone has been found to have no effect. It is thought that the organic distillate and the reaction product of fatty acid and amine-containing compound coact in some manner to prevent the formation of deposits.

It has been found necessary to employ organic distillates having flash points greater than 100° F. Otherwise, the organic distillate would be lost during the reaction step due to the substantial heat formed by the phosphoric rock-sulfuric acid reaction. In other words, one should maintain at least some portion of the organic distillate in the system during the concentration step if proper deposit perevention is to be effected.

It will be evident that various modifications can be made to the described embodiments of the process of this invention without departing from the scope of the present invention.

What is sought to be protected by the Letters Patent is:

1. In a process for manufacturing phosphoric acid from phosphate rock, wherein phosphate rock is reacted with sulfuric acid to form insoluble calcium sulfate and phosphoric acid, said calcium sulfate is subsequently removed

TABLE I.—PHOSPHORIC ACID PROCESS ANTIFOULANTS

| Reaction product | | Organic distillate | Closed cup flash point, ° F. |
|---|---|---|---|
| Fatty acid | Amine-containing compound | | |
| Tall oil | Diethylenetriamine | Naphtha, coal tar | 100–110 |
| Red oil | Tetraethylene-pentamine | Mineral seal oil | 170 |
| Stearic acid | Tripropylene tetraamine | Pine tar oil | 144 |
| Oleic acid | Aminoethyl ethanolamine | Kerosene | 100–165 |
| Linoleic acid | Aminopropyl propanolamine | Fuel oil No. 5 | 150+ |
| Palmitic acid | Aminoethyl propanolamine | Fuel oil No. 6 | 150+ |

Various antifoulants of this invention, such as those exemplified in Table I, have been employed in the process of manufacturing phosphoric acid from phosphoric rock. Significant improvements in the reduction of deposits, both on filtration devices and concentration devices have been noted. In filtration devices, improvements in the order of 20% to as high as 100% improvement in flow rates has been noted. Further, the effect of the antifoulants of this invention in minimizing deposit formation in heat exchangers and other concentration devices has also been noted. In a typical phosphoric acid production operation, the use of an antifoulant comprising the reaction product of tall oil fatty acids and diethylenetriamine mixed with mineral seal oil was capable of preventing deposit formation on a heat exchanger for three weeks. Normal production was limited to one week prior to the use of the antifoulants of this invention.

The compounds useful as antifoulants in the process of this invention have been thought to possess certain characteristics which stabilize a system containing crystals of calcium sulfate and phosphoric acid. In some manner, it is thought that the antifoulant assists in the prevention of small crystals of calcium sulfate from forming by somehow favoring the formation of the larger hydrate crystal forms of calcium sulfate. By so preventing the smaller crystals from forming, it is believed that substantially less opportunity is afforded for the sulfate crystals to plug the filter media. Likewise, the number of particles which pass through the filter and remain with the purified acid is substantially reduced. Also, it is believed that the antifoulants of this invention are especially capable of maintaining the minute crystals in suspension during the higher temperatures of the concentration step, thereby preventing formation of deposits on the heat exchanger surfaces.

from said acid by means of a filtration device to form a purified acid, and said purified acid is concentrated to form a concentrated phosphoric acid solution containing up to about 54% by weight $P_2O_5$ by means of a concentration device; the improvement which comprises adding to said rock prior to filtration at least an antifouling amount of an additive comprising (1) from 1% to 40% by weight of the product formed from reaction of a fatty acid and an amine-containing compound selected from the group consisting of alkylene polyamines and aminoalkyl alkanolamines and (2) 60% to 99% by weight of an organic distillate having a closed cup flash point greater than 100° F., thereby preventing formation of deposits on said filtration and concentration devices.

2. In the process of claim 1, where the antifouling amount of said additive ranges from 5 p.p.m. to 2000 p.p.m., based on the weight of the phosphate rock.

3. The process of claim 1 where said fatty acid contains at least 12 carbon atoms.

4. The process of claim 1 where said amine-containing compound is diethylene triamine.

5. The process of claim 1 where said amine-containing compound is aminoethyl ethanolamine.

References Cited

UNITED STATES PATENTS 2,141,571  12/1938  Kennedy et al. _____ 241—16 X
2,460,267  2/1949   Haddon _____ 23—122
3,192,014  6/1965   Peyshon et al. _____ 23—165

OSCAR R. VERTIZ, *Primary Examiner.*

A. GREIF, *Assistant Examiner.*